US00RE39391E

(19) United States
(12) Reissued Patent
Jerstroem et al.

(10) Patent Number: US RE39,391 E
(45) Date of Reissued Patent: Nov. 14, 2006

(54) COMPOSITE BOWL

(75) Inventors: Goeran Jerstroem, New York, NY (US); Carly White, Brooklyn, NY (US)

(73) Assignee: Helen of Troy Limited, Bridgetown (BB)

(21) Appl. No.: 10/641,861

(22) Filed: Aug. 15, 2003

Related U.S. Patent Documents

Reissue of:
(64) Patent No.: 6,431,389
Issued: Aug. 13, 2002
Appl. No.: 09/627,168
Filed: Jul. 27, 2000

(51) Int. Cl.
*A47G 23/00* (2006.01)

(52) U.S. Cl. ..... 220/574.3; 220/574; 220/62.22; 220/62.13

(58) Field of Classification Search ..... 220/62.13, 220/62.22, 573.1, 574, 574.3, 626, 656, 658
See application file for complete search history.

(56) References Cited

U.S. PATENT DOCUMENTS

| | | | |
|---|---|---|---|
| 1,574,259 | A | 2/1926 | Sarff |
| 2,412,528 | A | 12/1946 | Morrell |
| 3,138,280 | A | 6/1964 | Shafer |
| 3,568,872 | A | 3/1971 | Logomasini |
| 3,698,594 | A | 10/1972 | Boehlert |
| 3,788,513 | A | 1/1974 | Racz |
| 4,692,132 | A | 9/1987 | Ikushima et al. |
| 4,702,390 | A | 10/1987 | Rinkovsky, Sr. |
| 4,828,134 | A | 5/1989 | Ferlanti |
| 5,169,023 | A | 12/1992 | Heiberg et al. |
| 5,213,227 | A | 5/1993 | Koyama et al. |
| 5,388,716 | A | 2/1995 | Stoffel et al. |
| 5,419,454 | A | 5/1995 | Stowell et al. |
| 5,423,452 | A | 6/1995 | Tardif |
| D367,582 | S | 3/1996 | Desbarres |
| 5,600,334 | A | 2/1997 | Whitehouse |
| 5,740,941 | A | 4/1998 | Lemelson |
| 5,867,883 | A | 2/1999 | Iorio et al. |
| 5,884,672 | A | 3/1999 | Noone et al. |
| 5,943,781 | A | 8/1999 | Kim |

*Primary Examiner*—Nathan J. Newhouse
*Assistant Examiner*—Harry Grosso
(74) *Attorney, Agent, or Firm*—Seyfarth Shaw LLP

(57) ABSTRACT

A composite bowl has a seamless, one-piece, stainless steel inner body with a covering or outer body formed of a flexible and resilient frictional material. The outer body has an enlarged bead around the rim of the bowl and the stainless inner body is rolled around the bead.

29 Claims, 2 Drawing Sheets

COMPOSITE BOWL

Matter enclosed in heavy brackets [ ] appears in the original patent but forms no part of this reissue specification; matter printed in italics indicates the additions made by reissue.

BACKGROUND

The present application relates to a cookware receptacle and, in particular, to mixing bowls.

Mixing bowls have been formed of a variety of different materials, including glass, ceramic, metal and the like. Such bowls are commonly used in different positions. In one position, such as for use with an electric mixer or the like, the bowl is disposed in an upright position resting on a generally flat base with the central axis of the bowl disposed substantially vertically. When used with hand mixers or beaters, whisks or the like, the bowl is typically tilted to facilitate entry of the stirring or mixing implement into the open mouth of the bowl and manipulation thereof. For this purpose, the user will typically grasp the edge of the bowl with one hand to tilt it while operating the mixing implement with the other hand.

A typical mixing bowl has a generally semi-spherical shape with a smooth outer surface which has a tendency to slip or slide along underlying support surfaces in use. Furthermore, such bowls may be difficult to grasp firmly, particularly if the user's hands are wet.

In order to alleviate these difficulties, it is known to provide bowls formed of plastic materials with flexible anti-skid rings or bottom portions to inhibit skidding along support surfaces. Bowls have also been provided with enlarged rim flanges or handles to facilitate grasping. U.S. Pat. No. 5,169,023 to Heiberg et al., discloses a composite bowl with an inner rigid plastic shell and an outer elastic shell formed by co-molding. However, the plastic material of the bowl is not suitable for all applications.

SUMMARY

The present application discloses an improved composite mixing bowl which avoids advantages of prior bowls while affording additional structure or operating advantages.

A feature is a provision of a bowl of the type set forth which is of simple and economical construction, yet is sturdy and ergonomically designed.

Another feature is the provision of a bowl of the type set forth which has a unique metal/elastomeric composite construction.

In particular, there is provided a composite receptacle comprising: a rigid imperforate inner body having an outer surface and forming an open-top vessel having an upstanding peripheral side wall, the side wall having a laterally outwardly projecting flange forming an upper lip extending around the periphery of the inner body, the lip extending downwardly and back inwardly toward the side wall to form a channel, and an outer body of flexible and resilient material covering and fixed to the outer surface of the inner body, the outer body having a peripheral bead filling the channel.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 2:
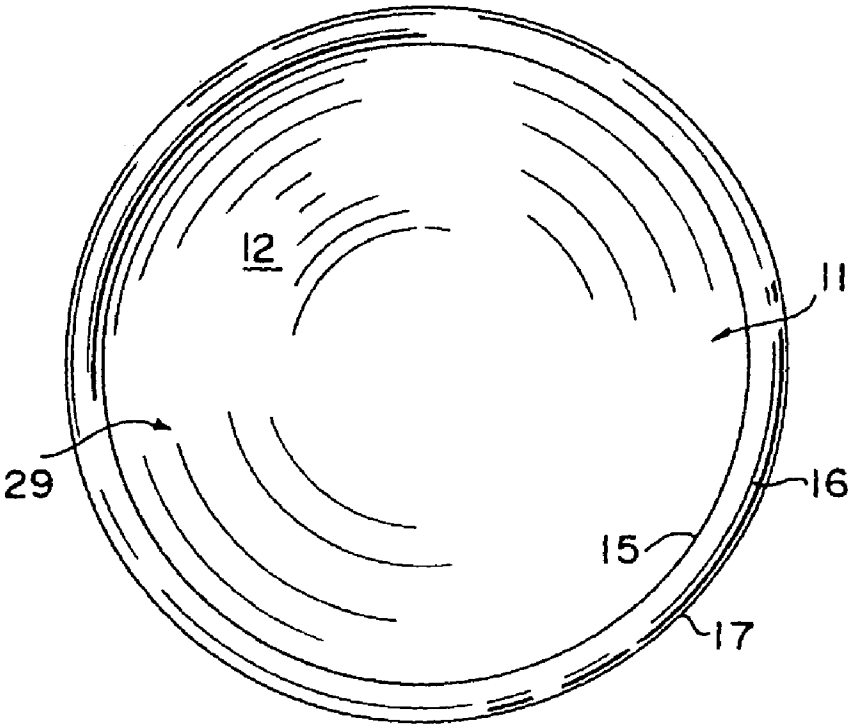
FIG. 2 is a top plan view of the bowl of FIG. 1.
Figure 1:
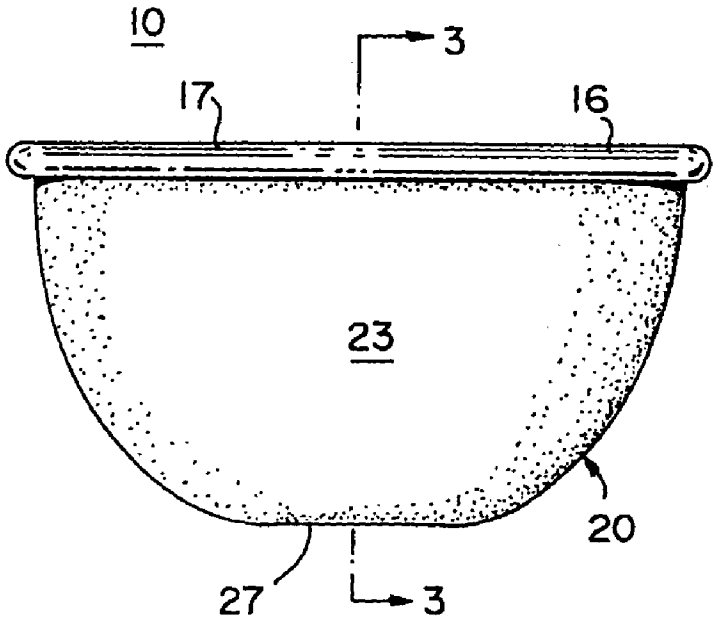
FIG. 1 is a side elevational view of a composite bowl.
Figure 3:
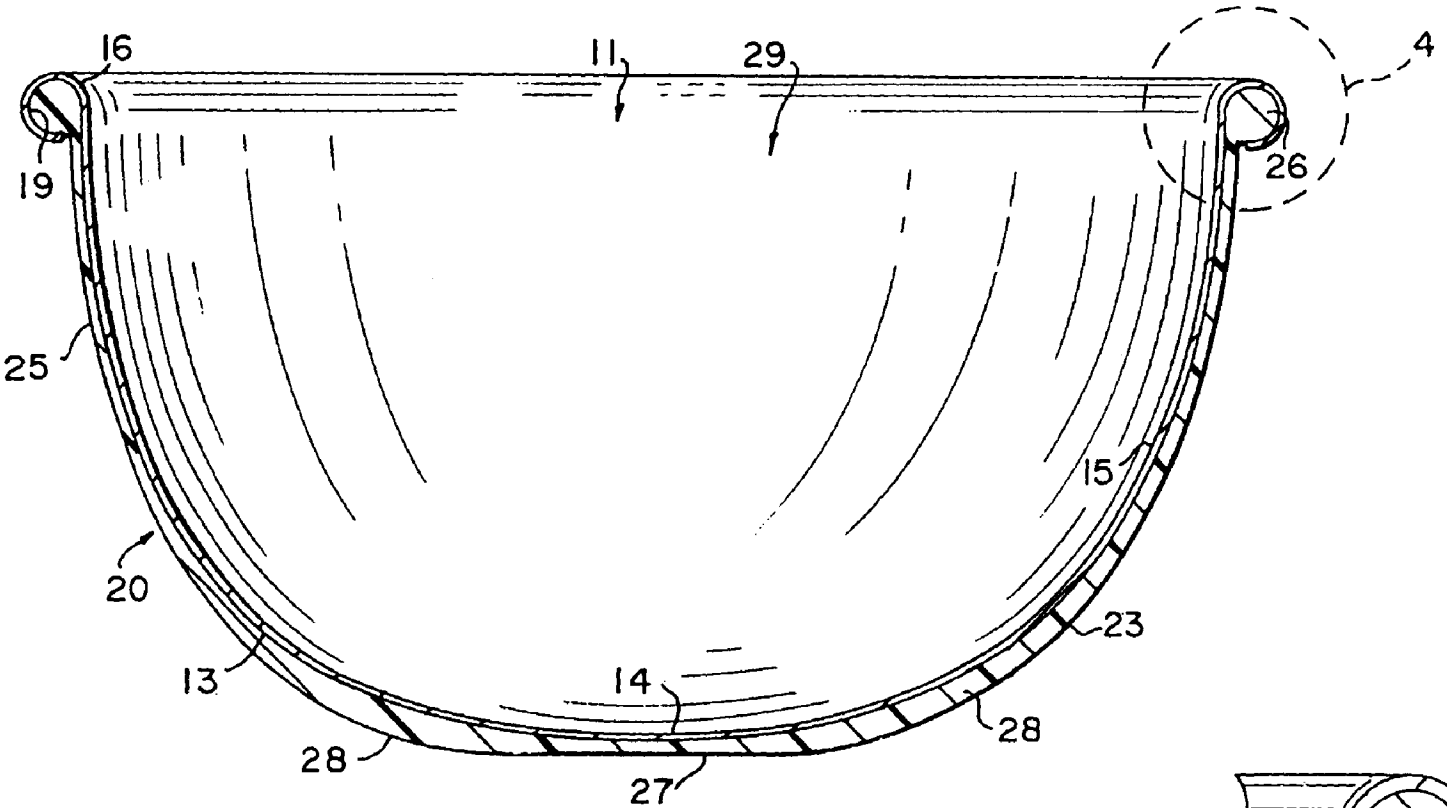
FIG. 3 is a sectional view taken generally along the line 3—3 in FIG. 1.
Figure 4:
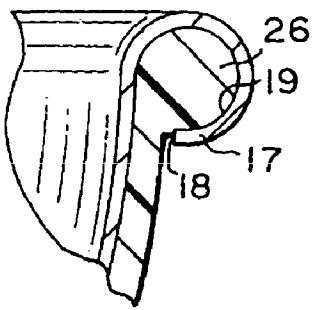
FIG. 4 is an enlarged, fragmentary sectional view of a portion of FIG. 3.

Referring to the drawings, there is illustrated a composite bowl, generally designated by the numeral 10, which includes a seamless, one-piece inner body 11, formed of a suitable metal, such as stainless steel. The inner body 11 is generally part-spherical in shape and has an inner surface 12 and an outer surface 13, the body 11 defining a curvilinear bottom 14 and curvilinear upstanding side wall 15. The side wall 15 has an upper end portion or flange 16 extending around the periphery thereof and defining the wide, open mouth at top of the bowl. The flange 16 is curved laterally outwardly and then downwardly to define a generally tubular lip 17 which terminates at a distal edge 18 spaced a slight distance from the outer surface of the side wall 15 to define a channel 19, which is a part-circular in transverse cross section.

Bowl 10 also includes an outer body 20 formed of a flexible and resilient frictional material, such as an elastic material of a type sold under the trade name Santoprene, which is adhered to and covers the outer surface 13 of the inner body 11. The outer body 20 has an outer surface 23 and defines a bottom portion 24, which covers the inner body bottom 14, and a side portion 25 which covers the inner body side wall 15. The side portion 25 terminates at its upper end in a peripheral bead 26 which fills the channel 19 and is substantially circular in transverse cross section, so that the edge 18 of the flange 16 is disposed of the juncture between the bead 26 and the remainder of the outer body side portion 25. The outer surface of the 23 of the outer body 20 has a substantially flat bottom surface portion 27. The thickness of the outer body 20 varies, having a thickened region 28 around the periphery of the inner body bottom 14. The outer body 20 is fixedly secured to the inner body 11 by suitable means, as by being bonded thereto or molded thereon. The resulting composite bowl 11 defines a receptacle 29 for receiving food stuffs or the like.

The composite bowl 10 is particularly useful as a mixing bowl, the stainless steel inner body 11 providing desirable qualities of rigidity, durability, stain resistance, ease of clean-up and the like, characteristic of stainless steel utensils. The outer body 20 forms a resilient frictional surface which resists sliding or skidding of the bowl along an underlying support surface, facilitates griping by a user's hand, cushions the bowl in use, and provides a stable, non-slip engagement with an underlying support surface to facilitate tipping of the bowl during use. The bowl 10 can readily be formed by injection molding of the outer body 20 over the pre-formed inner body 11.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A composite receptacle comprising:

a rigid imperforate inner body having an outer surface and forming an open-top vessel having an upstanding peripheral side wall, the side wall having a laterally outwardly projecting flange forming an upper lip extending around the periphery of the inner body, the lip extending downwardly and back inwardly toward the side wall to form a channel, and an outer body of flexible and resilient material completely covering and fixed to the outer surface of the inner body, the outer body having a peripheral increased-thickness, single-layer bead filling the channel.

2. The receptacle of claim 1, wherein the inner body is formed of metal.

3. The receptacle of claim 1, wherein the side wall is curvilinear.

4. The receptacle of claim 1, wherein the inner body has a curvilinear bottom.

5. The receptacle of claim 4, wherein the outer body has an outer surface with a substantially flat bottom portion.

6. The receptacle of claim 1, wherein the outer body has a variable thickness.

7. The receptacle of claim 1, wherein the outer body is formed of a frictional material.

8. The receptacle of claim 1, wherein the channel is part-circular in transverse cross section.

9. The receptacle of claim 1, wherein the side wall is circular in horizontal cross section.

10. A composite receptacle comprising:

a rigid imperforate inner body having an outer surface and forming an open-top vessel having an upstanding peripheral side wall, the side wall having an upper end portion, and an outer body of flexible and resilient material completely covering and fixed to the outer surface of the inner body, the outer body having a thickened laterally outwardly projecting, single-layer bead at an upper end thereof and extending along the entire periphery thereof, the upper end portion of the inner body being wrapped around the bead and fixed thereto for substantially covering the bead.

11. The receptacle of claim 10, wherein the bead is substantially circular in transverse cross section.

12. The receptacle of claim 10, wherein the outer body is formed of a frictional material.

13. The receptacle of claim 10, wherein the outer body has a variable thickness.

14. The receptacle of claim 10, wherein the outer body has an outer surface with a substantially flat bottom portion.

15. The receptacle of claim 14, wherein the inner body has a curvilinear bottom.

16. The receptacle of claim 10, wherein the inner body is formed of metal.

17. The receptacle of claim 10, wherein the upper end portion of the inner body terminates at a junction between the bead and the remainder of the outer body.

18. The receptacle of claim 1, wherein the inner body is of one-piece unitary construction and has an inner surface disposed for contact with contents of the receptacle.

19. The receptacle of claim 10, wherein the inner body is of one-piece unitary construction and has an inner surface disposed for contact with contents of the receptacle.

*20. A composite receptacle comprising:*

*a rigid imperforate inner body having an outer surface and forming an open-top vessel having an upstanding peripheral side wall,*

*the side wall having a laterally outwardly projecting flange forming an upper lip extending around the periphery of the inner body,*

*the lip extending downwardly and back inwardly toward the side wall to form a channel, and*

*an outer body of flexible and resilient material fixed to the inner body and completely covering the outer surface thereof,*

*the outer body having a peripheral increased-thickness, non-folded bead filling the channel.*

*21. The receptacle of claim 20, wherein the inner body is formed of metal.*

*22. The receptacle of claim 20, wherein the outer body has a variable thickness.*

*23. The receptacle of claim 20, wherein the outer body is formed of a frictional material.*

*24. The receptacle of claim 1, wherein the channel is part-circular in transverse cross section.*

*25. A composite receptacle comprising:*

*a rigid imperforate inner body having an outer surface and forming an open-top vessel having an upstanding peripheral side wall,*

*the side wall having an upper end portion, and*

*an outer body of flexible and resilient material fixed to the inner body and completely covering the outer surface thereof,*

*the outer body having a thickened laterally outwardly projecting, non-folded bead at an upper end thereof and extending along the entire periphery thereof,*

*the upper end portion of the inner body being wrapped up around the bead and fixed thereto for substantially concealing the bead from view.*

*26. The receptacle of claim 25, wherein the bead is substantially circular in transverse cross section.*

*27. The receptacle of claim 25, wherein the outer body is formed of a frictional material.*

*28. The receptacle of claim 25, wherein the outer body has a variable thickness.*

*29. The receptacle of claim 25, wherein the inner body is formed of metal.*

* * * * *